E. T. WILLIAMS.
REFRIGERATING MACHINE.
APPLICATION FILED SEPT. 15, 1915. RENEWED JAN. 17, 1919.

1,312,600.

Patented Aug. 12, 1919.
3 SHEETS—SHEET 1.

Witnesses:
William P. Johnson
L. S. Dunham

Inventor
E. T. Williams,
By his Attorneys
Kerr, Page, Cooper & Hayward

E. T. WILLIAMS.
REFRIGERATING MACHINE.
APPLICATION FILED SEPT. 15, 1915. RENEWED JAN. 17, 1919.

1,312,600.

Patented Aug. 12, 1919.
3 SHEETS—SHEET 2.

Witnesses:
William P. Johnson
A. S. Dunham

Inventor
E. T. Williams,
By his Attorneys
Kerr, Page, Cooper & Hayward

E. T. WILLIAMS.
REFRIGERATING MACHINE.
APPLICATION FILED SEPT. 15, 1915. RENEWED JAN. 17, 1919.

1,312,600.

Patented Aug. 12, 1919.
3 SHEETS—SHEET 3.

Witnesses:
William P. Johnson
A. L. Dunham

Inventor
E. T. Williams,
By his Attorneys
Kerr, Page, Cooper & Hayward

UNITED STATES PATENT OFFICE.

EDWARD T. WILLIAMS, OF NEW YORK, N. Y.

REFRIGERATING-MACHINE.

1,312,600.  Specification of Letters Patent.  Patented Aug. 12, 1919.

Application filed September 15, 1915. Serial No. 50,796. Renewed January 17, 1919. Serial No. 271,756.

*To all whom it may concern:*

Be it known that I, EDWARD T. WILLIAMS, a citizen of the United States, residing at New York, in the county and State of New York, have invented certain new and useful Improvements in Refrigerating-Machines, of which the following is a full, clear, and exact description.

This invention relates to refrigerating machines, particularly those designed for the use of small consumers, as in private households, on private yachts, in small shops and stores, etc. Its chief object is to provide an efficient apparatus in which a non-inflammable refrigerant, as for example carbon tetrachlorid, can be used. Another object is to provide apparatus possessing marked economy in the cooling medium, usually water, employed for cooling the compressed refrigerant to the point of liquefaction, thereby adapting the apparatus for use in regions where water, especially cold water, is scarce. To these and other ends the invention consists in the novel features and combinations of elements hereinafter described.

In general, the machine operates on the usual principle; that is, a liquefied gas or a sufficiently volatile liquid is expanded through a fine orifice into a closed expansion chamber, thereby absorbing heat from the chamber and its surroundings, and is pumped from the expansion chamber and compressed into a condensing chamber where it is cooled to the liquid state. In the preferred form of the invention the expansion chamber is located in a "refrigerator" and is suitably disposed with respect to a tank or vessel adapted to contain water so that part of the cooling effect will be utilized in producing ice. The pump or compressor employed is preferably of the rotary type and is inclosed in a casing which, for convenience, may be termed the pump chamber or compressor chamber. Superposed on the latter is the condensing chamber, into which the gas is forced by the compressor. The condensing chamber contains a system of piping through which water is passed for the purpose of cooling the compressed refrigerant to the point of liquefaction, the water also flowing through the compressor chamber and submerging the compressor (preferably but not necessarily before passing to the cooling coils in the condensing chamber) to absorb heat of compression from the compressor. From the condensing chamber the water is discharged preferably into a storage tank, for reuse, the water simply flowing from the storage tank to the machine and then back again to the tank.

Several forms of the invention are illustrated somewhat diagrammatically in the accompanying drawings, in which—

Figure 3:
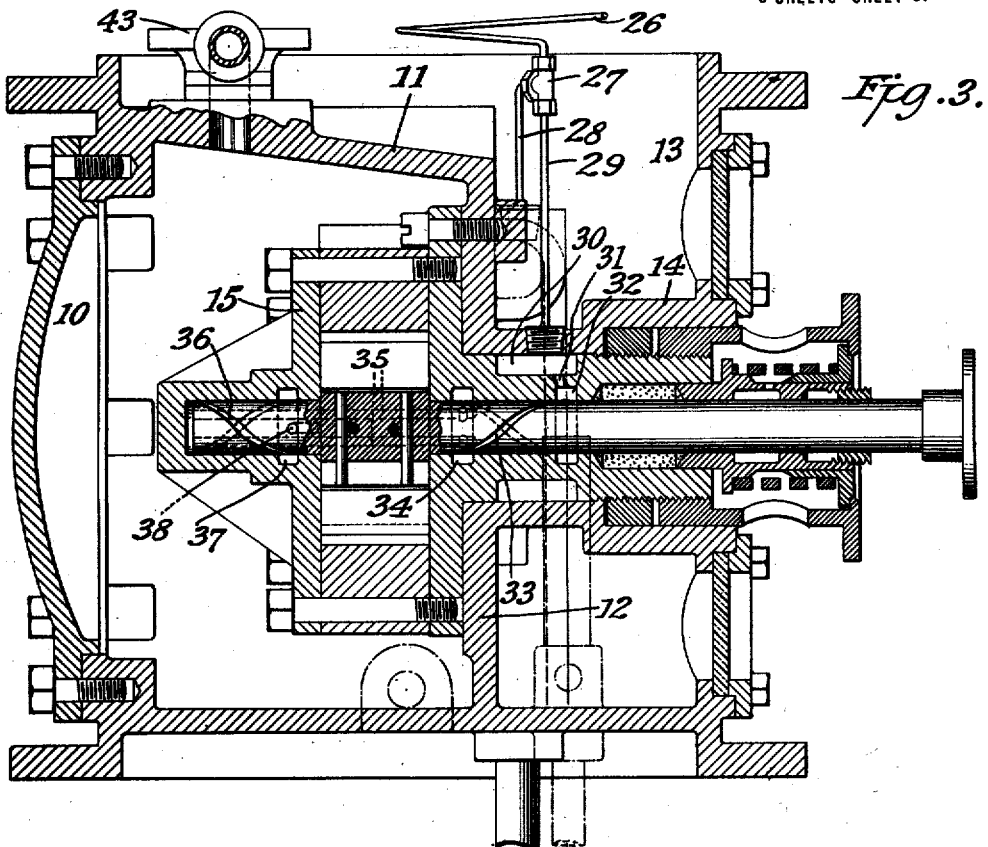
Fig. 3 is a central section through the pump chamber, at right angles to the plane of Fig. 1.

The compressor chamber 10 is similar to that used in the machine described and claimed in my copending application Ser. No. 30,282, filed May 25, 1915, and comprises a casting of substantially cylindrical shape having near its top a transverse partition 11 sloping downwardly from one side to the vertical partition 12, which latter provides a well 13 at the side of the chamber and has an outwardly extending tubular neck 14 providing a support for the shaft-bearing of the compressor 15. The latter, of the rotary type as already stated, is suitably fastened to the opposite side of the partition 12, as clearly indicated in Fig. 3.

The expansion chamber 16, in the form of a coil of pipe, is located in the refrigerator, the top of which latter is indicated at 17. The outlet of the expansion chamber is connected to a passage 18 leading to the low pressure or suction side of the compressor, and between said chamber and compressor is a suitable check valve 19 to prevent backflow of gas or lubricant from the condensing chamber (described below) through the compressor to the expansion chamber. This important feature is claimed in my copending application, Ser. No. 46,046, filed August 18, 1915.

The condensing chamber 20, in the form of a pressed-metal dome, is superposed on the compressor chamber and receives gas under pressure from the compressor through a vertical gas-discharge pipe 21 terminating near the top of the chamber.

Carbon tetrachlorid, the refrigerating agent for which the machine is primarily designed, is heavier than glycerin, the "oil" commonly used for lubricating the machine. Hence the liquefied refrigerant (usually referred to as the "gas") is deposited first in the well 13, which is virtually a part, or a downward continuation, of the condensing chamber. Preferably the gas is in such quantity that the liquefied portion thereof will extend some distance up in the well or even to or above the top thereof. From the well the liquefied gas escapes through an orifice 22 in the bottom and flows thence to the expansion valve 23 opening into the expansion chamber.

As before stated, the glycerin used as the lubricant is lighter than the liquefied refrigerant and hence floats in a body or layer on top of the same. Accordingly the intake 24 of the lubricating system is carried by a float 25, of such buoyancy as to support the intake slightly above the surface of the liquefied gas at all times. Then with a suitable quantity of glycerin in the condensing chamber the intake will always be in the glycerin. The intake is connected to the compressor in any convenient manner which will permit the float to rise and fall freely as the quantity of liquefied gas varies. Preferably the intake is at the end of a thin metal tube 26, coiled in helical fashion as shown, the number and diameter of the turns being sufficient to give the float the necessary freedom of movement. At the point 27 the pipe branches, the branch 28 going to the passage 18 through which the gas from the expansion chamber enters the compressor, and the branch 29 leading to an annular chamber 30 around the outer bearing of the compressor shaft, from which chamber the glycerin flows through a port 31 into an annular pocket 32 inside the bearing. Helical grooves 33 in the journal of the compressor shaft convey the glycerin to a second annular pocket 34. Ducts 35 are provided to carry the glycerin from pocket 34 through the shaft to the inner bearing thereof, and the journal at the inner end of the shaft is formed with helical grooves 36 to carry the lubricant back to an annular pocket 37 formed in said inner bearing, from which a duct 38 in the journal delivers the glycerin to the suction side of the compressor. In this way there is available the full difference of pressure, between the suction and pressure sides of the compressor, to force the glycerin through the compressor bearings. This effect is aided, moreover, by the screw or pump action of the helical grooves 33, 36, as will be readily understood.

If the quantity of liquefied gas should for any reason be too small to keep the floating glycerin above the gas outlet of the condensing chamber more or less glycerin would pass to the expansion valve and into the expansion chamber,—results that it is important to avoid. Accordingly the needle valve 40 is provided for the gas-outlet 22. This valve, guided by the upright tube 41, is carried by a float, preferably the float 25, which, as before stated, floats at the surface of the liquid refrigerant. If the latter diminishes in volume the float falls correspondingly and permits the valve to close the outlet 22 before the glycerin reaches the same, thereby preventing admission of glycerin to the expansion valve should the glycerin sink still lower.

Figure 4:
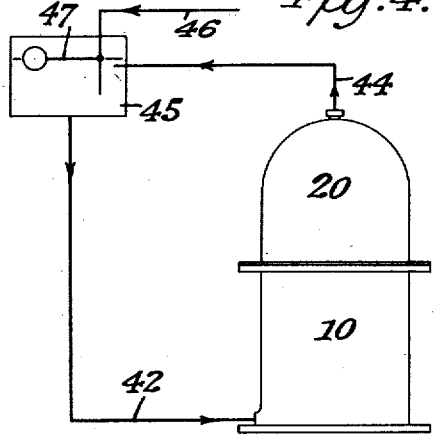

The water or other cooling medium enters the machine through the pipe 42 at the bottom of the pump chamber and, rising in the latter and submerging the compressor, passes out through the fitting 43 into the cooling coil 44 which extends out through the top of the condensing chamber. The water is therefore coolest in the pump chamber, effectively absorbing the heat of compression. It is still cool enough to liquefy the vapor or gas in the condensing chamber, even though the pressure therein be very moderate, when such a refrigerant as carbon tetrachlorid is used. For instance, at atmospheric pressure, liquefaction of gaseous carbon tetrachlorid occurs at about 160° F.; and at or but little less than 212° F. when the pressure is only about thirteen and a half pounds above atmospheric. It will thus be seen that the condensing water can be allowed to rise to a high temperature, even to the boiling point, without great loss of efficiency. This makes it conveniently possible to use the same water over again. Moreover, the water, being coolest in the lower chamber, is warmest in the upper or condensing chamber, a circumstance that is availed of to produce the circulation. For this purpose a storage reservoir 45 (Fig. 4) is provided, to which the pipes 42 and 44 are connected, as shown. The reservoir is supplied with fresh water through a supply pipe 46 to compensate for loss from the tank by evaporation. The supply pipe is controlled by a float valve 47 so that a substantially constant head is maintained automatically.

Figure 1:
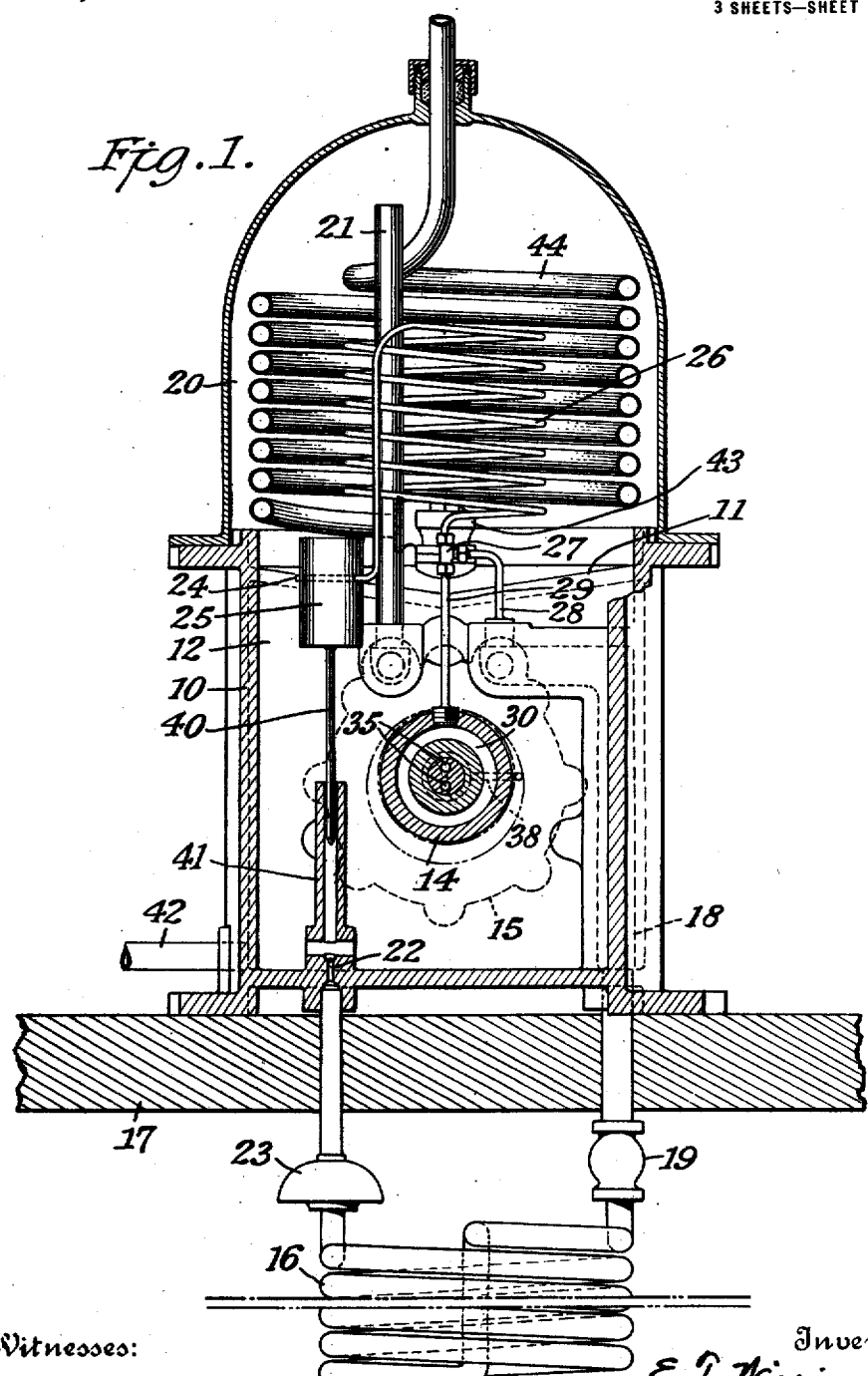
Figure 1 is a vertical section of the preferred type of machine.
Figure 2:
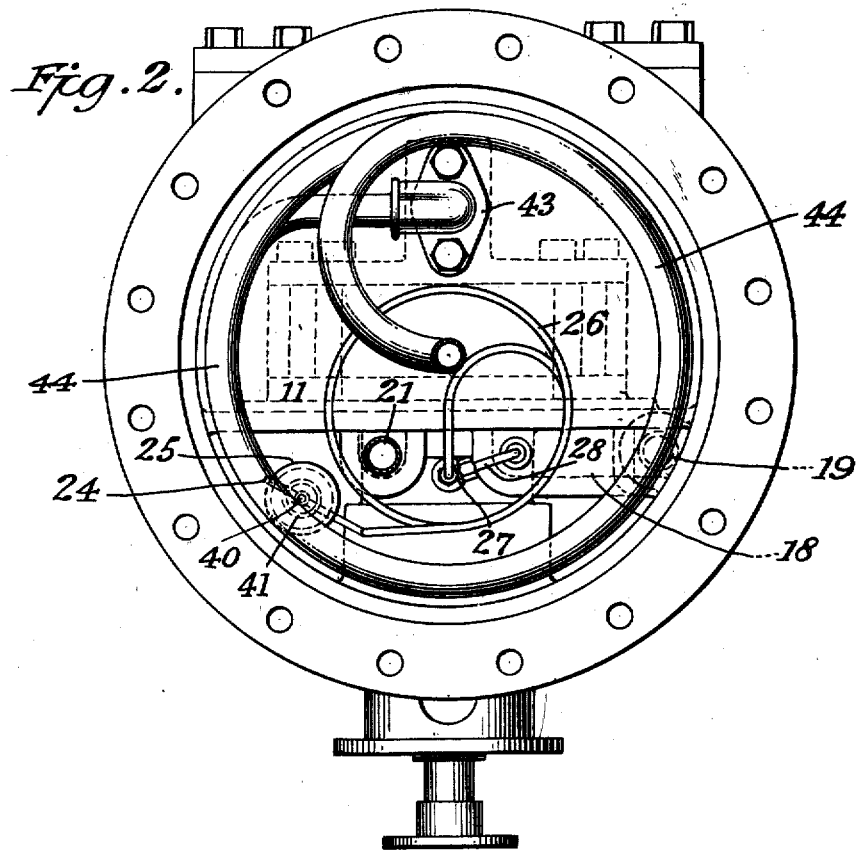
Fig. 2 is a plan view of the pump chamber.
Figure 6:
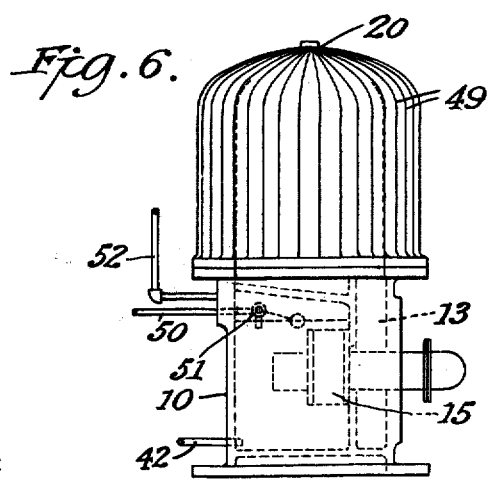
Fig. 6 is a diagram illustrating still another form of the invention.
Figure 5:
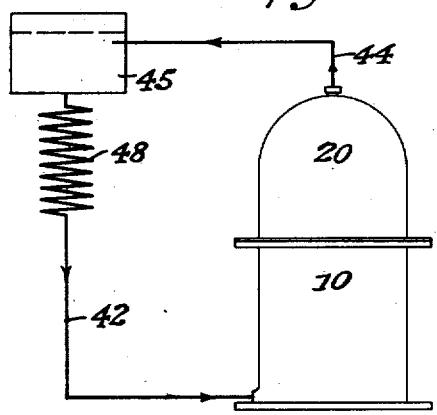
Figs. 4 and 5 are diagrams illustrating two methods of utilizing the cooling medium.

Still further saving of water can be secured by providing a heat-radiator, as for example the coil 48, in the pipe 42, Fig. 5. Indeed, the use of water for condensing purposes can be eliminated entirely, by employing the dome of the condensing chamber as a radiating surface. For such purpose the dome can be fluted or provided with fins, as at 49, Fig. 6, to increase its surface area. In this case, however, water should be supplied to the compressor chamber to take up the heat of compression. Thus in Fig. 6 the water is supplied by a pipe 50, controlled by a float-valve 51 to maintain the water level in the compressor chamber substantially constant and high enough to submerge the compressor 15. A vent pipe 52 permits escape of water vapor from the compressor chamber.

A little reflection will make it clear that the carbon tetrachlorid or other refrigerant used is a vehicle, propelled and controlled by the rest of the apparatus, for taking heat from the expansion chamber. It is therefore an essential part of the apparatus, since without it the rest of the apparatus can perform no useful function. Moreover, it is, at least in theory, a permanent part of the apparatus, since alternate vaporization and liquefaction causes no destruction of the refrigerant. In practice there may be some unavoidable loss of the refrigerating agent due to mechanical imperfections; but in a well built machine, with tight joints, the loss is inappreciable even after long continued operation. Such loss would, however, be comparable to wear of a shaft or bearing, and not, for example, to the consumption of oil and pigment in a machine for applying paint by spraying.

It is to be understood that the invention is not limited to the structures herein specifically illustrated and described, but can be embodied in other forms without departure from its spirit.

I claim:

1. In a refrigerating machine, the combination with a chamber adapted to contain a liquefied refrigerant, and a compressor discharging refrigerant into said chamber, of means adapted to float in liquefied refrigerant for taking lubricant floating on the said liquefied refrigerant and delivering the same to the compressor.

2. In a refrigerating machine, the combination with a chamber adapted to contain a liquefied refrigerant, and a compressor discharging refrigerant into the said chamber, of movable means adapted to occupy a substantially constant position with respect to the surface of the liquefied refrigerant in said chamber, and means movable with the aforesaid means for conveying lubricant floating on the liquefied refrigerant to the compressor.

3. In a refrigerating machine, the combination with a chamber adapted to contain a liquefied refrigerant, and a compressor discharging refrigerant into said chamber, of a flexible conduit adapted to deliver lubricant to the compressor and having an intake orifice, and a device adapted to float in the liquefied refrigerant in said chamber and support the intake orifice of said conduit above the surface of the liquefied refrigerant, whereby lubricant floating on the surface of said refrigerant can be delivered to the compressor.

4. In a refrigerating machine, the combination with a compressor for compressing a refrigerant to a degree suitable for liquefaction, a chamber, and a liquefied refrigerant therein adapted to support a floating liquid lubricant, of means movable in correspondence with variation in the level of the liquefied refrigerant in said chamber for receiving lubricant and delivering the same to the compressor.

5. In a refrigerating machine, the combination of a compressor having one or more bearings and a shaft mounted therein and having passages for the flow of lubricant through the bearing or bearings into the compressor on its suction or low pressure side, a chamber in communication with the high pressure side of the compressor and adapted to contain a liquid lubricant and a liquefied refrigerant, an expansion chamber connected to the first-mentioned chamber and to the suction or low pressure side of the compressor, and means for delivering liquid lubricant from said chamber to said passages; whereby the full pressure in the first-mentioned chamber is exerted on the lubricant to force the same through the bearing or bearings.

6. In a refrigerating machine, the combination of a chamber adapted to contain a liquid lubricant and a liquefied refrigerant, an expansion chamber connected to the first-mentioned chamber to receive expanding refrigerant therefrom, a compressor connected on its suction or low pressure side to the expansion chamber and having an operating shaft provided with bearings and with passages for the flow of lubricant through the bearings one after the other and thence to the suction or low pressure side of the compressor, and means for delivering liquid lubricant from the first-mentioned chamber to the first of said bearings.

7. In a refrigerating machine, the combination of a chamber adapted to contain liquid lubricant and liquefied refrigerant; an expansion chamber connected to the first-mentioned chamber to receive expanding refrigerant therefrom; a compressor having inner and outer bearings and connected on its suction or low pressure side to the expansion chamber and on its high pressure side to the first-mentioned chamber; an operating shaft having journals mounted in said bearings and provided with helical grooves for the passage of lubricant, said shaft having between the journals passages for the flow of lubricant from one journal to the other, and having also a passage for the flow of lubricant from the inner bearing into the compressor on the suction or low pressure side of the same; and means for delivering liquid lubricant from the first-mentioned chamber to the outer bearing.

8. In a refrigerating machine, the combination of a chamber; a liquefied refrigerant therein, adapted to support a floating liquid lubricant; an expansion chamber receiving expanding refrigerant from the first-mentioned chamber; a compressor connected on its high pressure side with the first-mentioned chamber and on its suction or low pressure side with the expansion chamber and having inner and outer bearings; an operating shaft mounted in said bearings and provided with means for the passing of lubricant from one bearing to the other and thence into the compressor on the suction or low pressure side of the latter; a supporting device floating in the first-mentioned chamber; and a flexible pipe connected at one end to one of said bearings and having its other end open and supported by said device above the surface of the liquefied refrigerant in the first-mentioned chamber.

9. In a refrigerating machine, the combination of a chamber having an outlet; a liquefied refrigerant in the chamber, adapted to support a floating body of liquid lubricant; a compressor having its high pressure side connected with said chamber; an expansion chamber connected with said outlet and with the suction or low pressure side of the compressor; float-supported means for delivering lubricant from the floating body thereof; and automatic means for closing the outlet of the first-mentioned chamber when the floating body of lubricant falls to a predetermined point.

10. In a refrigerating machine, the combination of a chamber having an outlet; a liquefied refrigerant in the chamber, adapted to support a floating body of liquid lubricant; a compressor connected on its high pressure side with said chamber; means, movable vertically in substantial correspondence with rise and fall of the floating body of lubricant in said chamber, for delivering lubricant from said body to the compressor; and means movable with the first-mentioned means to close the outlet of said chamber when the lubricant supply sinks to a predetermined point.

11. In a refrigerating machine, the combination of a chamber having an outlet; a liquefied refrigerant in the chamber, adapted to support a floating body of liquid lubricant; a compressor having its high pressure side connected with said chamber; a float in said chamber; means supported by and movable with said float to deliver lubricant from the body thereof to the compressor; and a valve member carried by the float and adapted to close said outlet when the float sinks to a predetermined point.

12. In a refrigerating machine, the combination of a compressor chamber, a condensing chamber above the compressor chamber, a storage reservoir for a cooling medium having an outlet, means connecting the reservoir outlet with the compressor chamber for delivering cooling medium thereto, means for conveying cooling medium from the compressor chamber through the condensing chamber and thence back to the storage reservoir, the circulation of the cooling medium being caused by difference of temperature between the compressor chamber and the condensing chamber, and means for maintaining a substantially constant head in the storage reservoir.

13. A refrigerating apparatus as described in claim 12, in which the means for maintaining a substantially constant head in the storage reservoir comprises an inlet pipe for discharging fresh cooling medium into the reservoir, and a float-valve controlling the inflow from said pipe as the surface of the cooling medium in the reservoir rises and falls.

In testimony whereof I affix my signature.

EDWARD T. WILLIAMS.

Copies of this patent may be obtained for five cents each, by addressing the "Commissioner of Patents, Washington, D. C."